United States Patent [19]

Acosta

[11] Patent Number: 4,482,303
[45] Date of Patent: Nov. 13, 1984

[54] TURBO-COMPRESSOR APPARATUS

[76] Inventor: Ray Acosta, P.O. Box 541P, Bayshore, N.Y. 11706

[21] Appl. No.: 343,206

[22] Filed: Jan. 27, 1982

[51] Int. Cl.$^3$ ............................................. F04B 17/00
[52] U.S. Cl. .................................... 417/406; 384/121
[58] Field of Search .............. 417/405, 406, 407, 408, 417/409; 384/99, 121; 415/104, 105, 106, 107, 110, 111, 112, 113

[56] References Cited

U.S. PATENT DOCUMENTS

| | | | |
|---|---|---|---|
| 1,130,616 | 3/1915 | Lorenz | 415/106 |
| 2,319,913 | 5/1943 | Bentley | 415/105 |
| 3,059,415 | 10/1962 | Birmann | 417/406 |
| 3,071,691 | 1/1963 | Haddad et al. | 417/406 |
| 4,260,339 | 4/1981 | Lofts | 417/406 |
| 4,339,922 | 7/1982 | Navarro | 417/406 |

FOREIGN PATENT DOCUMENTS

| | | | |
|---|---|---|---|
| 493286 | 6/1953 | Canada | 417/406 |
| 241834 | 4/1969 | U.S.S.R. | 384/121 |

*Primary Examiner*—Carlton R. Croyle
*Assistant Examiner*—Jeffrey A. Simenauer
*Attorney, Agent, or Firm*—David Aker

[57] ABSTRACT

A turbo-compressor apparatus in which the turbine section and the compressor section are placed back-to-back. A non-rotating shaft axially supported in the apparatus supports an anti-friction bearing which, in turn, rotationally supports a rotor assembly. A separating member preferably comprised of a material of low thermal conductivity is provided between the turbine section and the compressor section. A fully floating, non-rotating sleeve bearing incorporating both thrust and radial surfaces is allowed to float freely on the shaft. Thus, thrust forces from the spinning rotor are initially absorbed at the large radial bearing surfaces located at approximately the center of the bearing and are thereby transferred to the small areas at either end of the sleeve bearing. The thrust forces are finally transferred from the sleeve bearing to the stationary shaft. The mechanically locked sleeve bearing also serves to retain the rotor on the stationary shaft. In the preferred embodiment, the stationary shaft is supported at only one of its ends, the unsupported end extending into a cylindrical opening in the rotor assembly which opening may be a blind hole.

21 Claims, 6 Drawing Figures

TURBO-COMPRESSOR APPARATUS

TECHNICAL FIELD

The present invention relates to turbo-compressor apparatus. In particular, it relates to such apparatus wherein a rotor assembly rotates on a stationary shaft.

BACKGROUND OF THE INVENTION

Conventional turbo-compressor apparatus, especially those designed to be used as turbosuperchargers for internal combustion engines, are generally constructed so as to have a compressor section, a turbine section and a bearing housing separating these sections. Lubricating oil is supplied to provide lubrication for a bearing in this housing in which a common shaft for the compressor impeller and turbine wheel rotates. The bearings in such a conventional turbo-compressor apparatus are generally fully floating sleeve type bearings which rotate at approximately half the rotational speed of the shaft. In U.S. Pat. No. 3,043,636 to MacInnes, however, a non-rotating sleeve bearing is used. This bearing, however, is a semi-floating device because a flange located at one end of the bearing is pinned to the bearing housing.

Turbo-compressors, according to these conventional designs, have an oil seal at each end of the bearing to prevent lubricating oil supplied to the bearing from entering the compressor section or the turbine section of the apparatus. The oil seal disposed near the turbine end of the bearing generally operates at relatively high temperatures and is a possible source of failure of the apparatus.

U.S. Pat. No. 2,911,138 to Birmann discloses a turbo-compressor in which a non-rotating shaft extends into a rotor assembly. Ball bearings rather than sleeve bearings are used in this design. Such bearings may present practical engineering difficulties if the apparatus is operated at a rotational speed close to its critical speed. Birmann attempts to solve this problem by providing means for mounting the stationary shaft and constraining it to move only substantially parallel to itself under stresses imparted to the shaft by the rotor. The shaft is supported by leaf spring members which converge towards the center of gravity of the rotor. Damping means in the form of elastic O-rings absorb vibrational energy imparted to the shaft.

Another design for a stationary shaft turbo-compressor type apparatus is disclosed in U.S. Pat. No. 3,692,436 to Connor et al.

While conventional turbo-compressors and various design modifications to these conventional devices have been relatively successful, they are generally comprised of a large number of machined components. These devices are in themselves expensive, costly to assemble and require substantial maintenance. Also, conventional stationary shaft designs do not themselves lend at all to down sizing due to the size restrictions and rotor speed (RPM) limitations imposed by ball type bearings.

BRIEF DESCRIPTION OF THE INVENTION

The present invention provides a turbo-compressor apparatus that is simple, reliable, inexpensive, and can be built in small sizes. The central bearing housing used in conventional turbo-compressors is eliminated by placing the turbine section and the compressor section back-to-back. A stationary or non-rotating shaft axially supported in the apparatus supports an antifriction bearing which, in turn, rotationally supports a rotor assembly which has a turbine wheel disposed within the turbine section and a compressor impeller disposed within the compressor section. A separating member is provided between the turbine section and the compressor section. This separator extends into an annular recess in the rotor assembly separating the turbine wheel from the compressor impeller. The separating member is preferably comprised of a material of low thermal conductivity (so as to reduce heat flow from the turbine section to the closely adjacent compressor section) and is preferably refractory in nature.

A bearing surface for the rotor assembly is defined by a cylindrical axially extending opening in the rotor. A single bearing means may be provided for both thrust and rotation. The bearing means is preferably a fully floating, non-rotating sleeve bearing disposed between the shaft and the cylindrical bearing surface. The rotor and sleeve bearing may be configured with a radially extending annular member located at approximately the center of the sleeve bearing and a complementary annular recess receiving the member where the member and the recess have parallel generally radial surfaces. These surfaces, of relatively large area, may act as thrust bearings transferring axial loads from the spinning rotor to small areas at the ends of the sleeve bearings, which loads are then transferred to the non-rotating shaft. Preferably, the sleeve bearing is configured with an annular member extending radially outward and the rotor is configured with an outwardly extending annular recess which accepts the outwardly extending annular member.

In the preferred embodiment of the invention, the shaft is supported at only one of its ends, the unsupported end extending into the cylindrical opening in the rotor assembly. The cylindrical opening may be a blind hole with a bottom defining the length of that cylindrical opening. The unsupported portion may extend to substantially the bottom of the cylindrical opening.

Advantageously, the shaft extends into the cylindrical opening from the compressor side of the rotor assembly. A source of pressurized lubricating fluid which provides a lubricating film upon which the bearing is supported also feeds lubricating fluid between the end of the unsupported portion of the shaft and the bottom of the cylindrical opening. The bottom of the cylindrical opening may thus serve as an additional thrust surface. Hydraulic pressure, generated by the fluid, provides an axial thrust which opposes the axial thrust exerted on the rotor assembly resulting from the pressure difference between the turbine section and compressor section.

A cylindrical extension member which circumferentially surrounds the sleeve bearing may be fixed to rotate with the rotor assembly and extend toward the supported end of the shaft. This member may have a radially, inwardly extending annular flange with a radial wall. A shoulder in the sleeve bearing with a second radial wall which is disposed in facing relationship to the radial wall of the annular flange would then be provided. This arrangement may provide an additional thrust bearing surface. As a result of pressurized lubricating fluid being introduced, an additional axial thrust is produced on the rotor assembly. The area of the radial wall of the annular flange may be selected so that the sum of the axial thrust produced on this radial wall and the axial thrust due to the above-mentioned pressure differential is closer to being equal to the axial thrust due to the hydraulic force of the lubricating fluid on the bottom of the cylindrical opening than would be the case in the absence of this structure.

In the preferred embodiment of the invention, a shaft supporting member is located within the air intake structure of the compressor housing portion so that it is in the path of air drawn into the compressor. Two or more ribs extending from a peripheral portion of the air intake structure support the shaft supporting member. Passageways within the ribs are provided for conducting lubricating fluid to and from the bearing structure. The cooling properties of the low pressure air at the inlet passing around the ribs aids in maintaining the lubricating fluid at a cooler operating temperature before entering the bearing thus tending to prolong service life.

The apparatus of this invention may be combined with a combustor and other necessary components to serve as an energy source that is, for example, a prime mover.

BRIEF DESCRIPTION OF THE DRAWINGS

For the purpose of illustrating the invention, there is shown in the drawings an embodiment which is presently preferred, it being understood, however, that the invention is not limited to the precise arrangements and instrumentalities shown.

DETAILED DESCRIPTION OF THE PREFERRED EMBODIMENT

Figure 1:
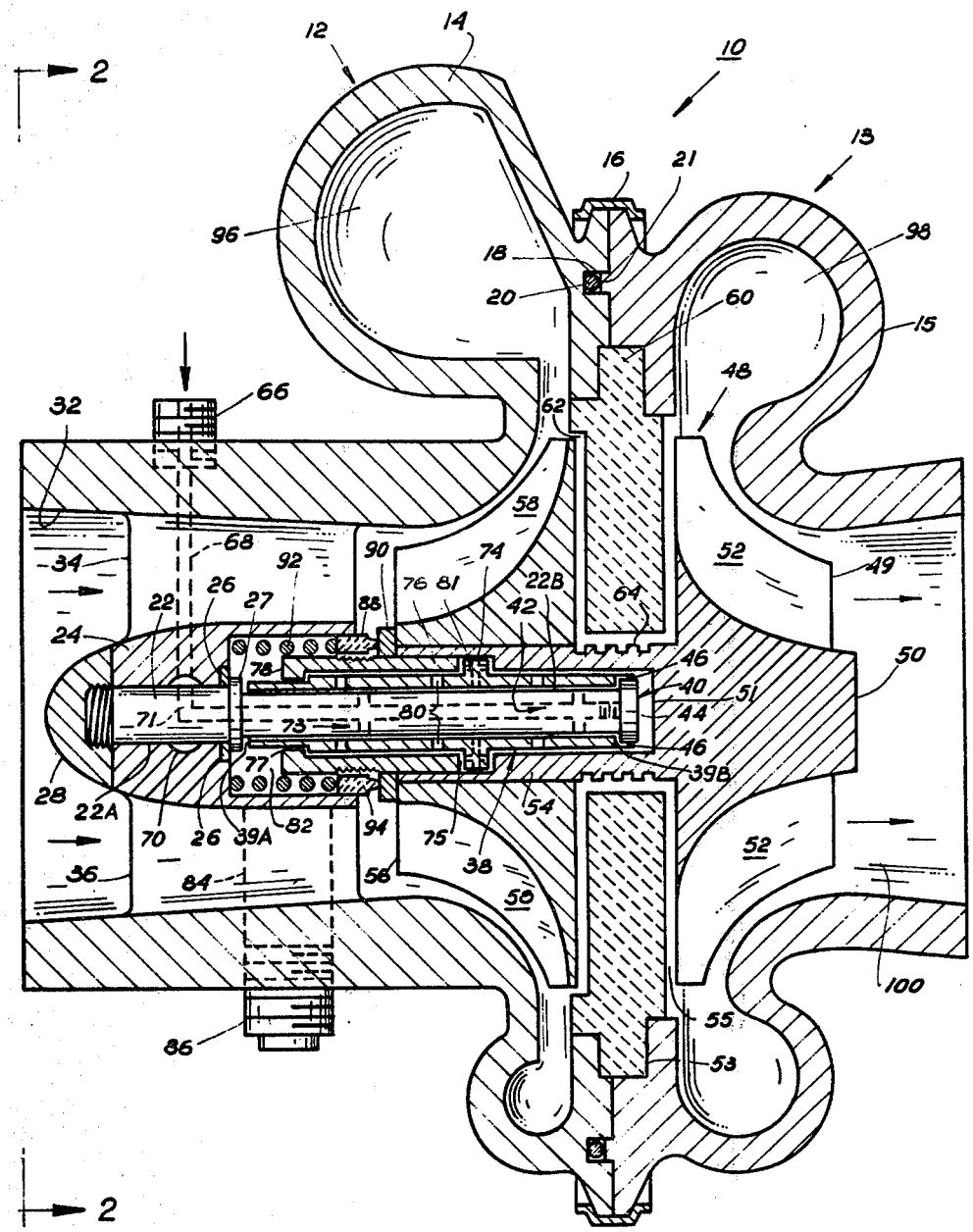
FIG. 1 is a view, partially in cross-section, of an apparatus according to the invention taken generally along line 1—1 of FIG. 2.

Referring now to the drawings, wherein like numerals indicate like elements, there is shown in FIG. 1 a turbo-compressor constructed in accordance with the present invention and designated generally as 10. Turbo-compressor 10 includes a compressor section 12 and a turbine section 13. Compressor section 12 is defined by a compressor housing section 14 preferably comprised of a cast aluminum alloy or plastic material. Turbine section 13 is defined by a turbine housing section 15 and is preferably comprised of a cast iron, such as ductile iron. Turbine section 13 is in back-to-back relation with compressor section 12 by virtue of compressor housing section 14 and turbine housing section 15 being secured to one another by use of a V-band clamp 16 of a type well known in the art. An annular groove 18 formed in compressor housing section 14 is fitted with an O-ring 20 and receives a mating annular member 21 formed on the turbine housing section 15. Elements 18, 20 and 21 cooperate to align housing sections 14, 15 and to provide a resilient seal therebetween.

Figure 2:
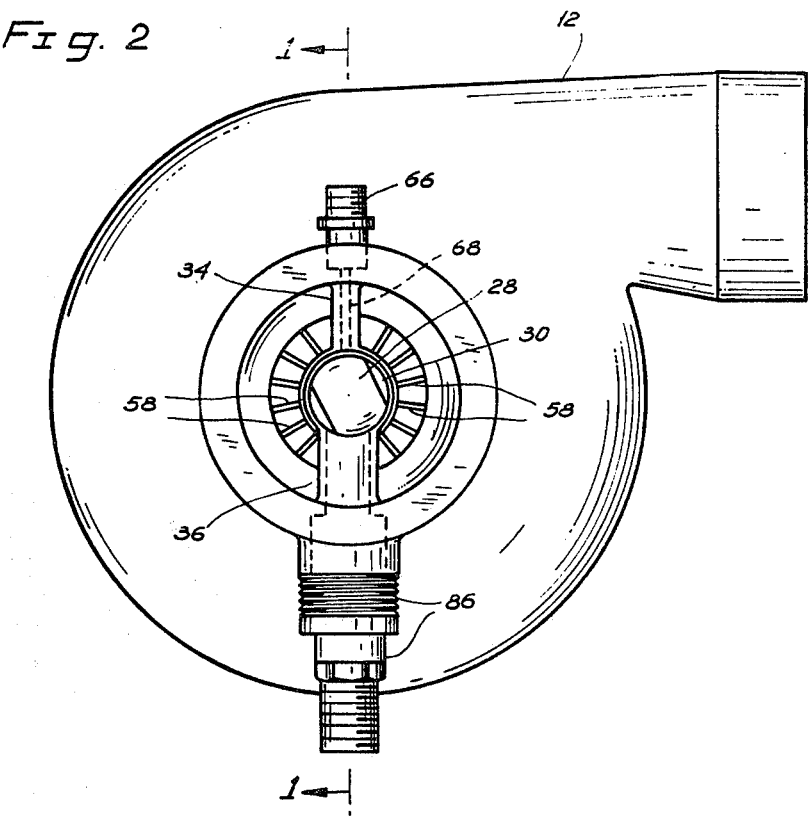
FIG. 2 is an end view facing the compressor side of the apparatus in the direction indicated by line 2—2 of FIG. 1.

A supported portion 22A of stationary shaft 22 (formed of mild steel or stainless steel) extends through a shaft support member 24 in the axial direction of turbo-compressor 10. A steel washer 26 is disposed between annular shoulder member 27 of shaft 22 and shaft support member 24 providing a hard abutment surface in lieu of the relatively soft material of shaft support member 24 which is an integral part of the casting of compressor housing section 14. A nut 28 is threaded onto the end of shaft 22 and is tightened by an appropriate tool which engages flat surfaces 30 (see FIG. 2) of nut 28. Nut 28 has generally an aerodynamic or bullet shape so as not to unduly disturb the flow of input air into air intake structure 32. Also in the path of intake air to the compressor section 12 are aerodynamically shaped radial support ribs 34 and 36 which support shaft supporting member 24 centrally within the air intake structure 32.

Surrounding substantially the remaining unsupported portion 22B of shaft 22 is a fully floating sleeve bearing 38 which is preferably machined from a suitable quality bearing material such as aluminum or bronze. Sleeve bearing 38 is axially secured on shaft 22 by the head 44 of a screw 40 which is threaded into an axially extending passageway 42 in shaft 22. Tolerances on the length of sleeve bearing 38 and the unsupported portion of shaft 22 between head 44 and annular shoulder member 27 are selected so that sleeve bearing 38 fully floats on shaft 22 with a small amount of axial play, for example, 0.006 inch. Radial clearance between the internal diameter of sleeve bearing 38 and the outer diameter of shaft 22 is preferably approximately 0.0005.

Figure 3:
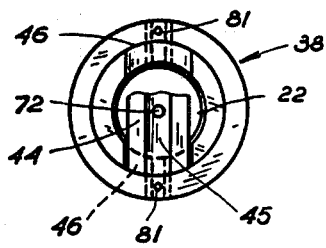
FIG. 3 is an end view of the turbine end of an assembly of the sleeve bearing and stationary shaft of the invention.
Figure 4:
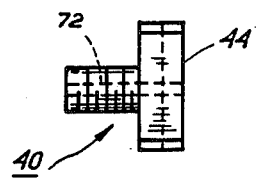
FIG. 4 is a side elevational view of one form of a screw used to secure the sleeve bearing to the stationary shaft.
Figure 5:
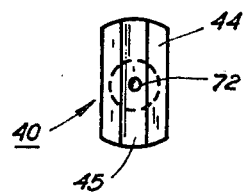
FIG. 5 is an end view of the screw shown in FIG. 4.

To absorb thrust and prevent rotation of sleeve bearing 38 on areas too small to handle rotating thrust loads, such as the radially extending surface of annular shoulder member 27, the head 44 of screw 40 is generally rectangular (see FIGS. 4 and 5) and fits into two circumferential cutouts 46 at the end of sleeve bearing 38 as best shown in FIG. 3.

An alternate means (not shown) of securing sleeve bearing 38 loosely to shaft 22 in fully floating relationship may comprise a pin fitting through a diametrically extending hole in shaft 22 and extending into corresponding diametrically opposed openings is sleeve bearing 38.

The assembly of shaft 22 and sleeve bearing 38 extends into a cylindrical opening in a rotor assembly 48 comprised of a turbine wheel 49, a compressor impeller 56 and a cylindrical connecting portion 54. Radial clearance between the inner diameter of this cylindrical opening and the outer diameter of sleeve bearing 38 is preferably approximately 0.0005 inch. Turbine wheel 49 has a webbing or core member 50 which is integrally formed with turbine blades 52 and cylindrical connecting portion 54. Although many possible designs may be used for the turbine wheel 49, a radial or mixed flow turbine of straight blade design with curved exducer outlet is preferred. The blades and the core member 50 may be formed from high temperature exotic alloys such as Stellite 31 or Inconel 713C.

Compressor impeller 56 is fitted to cylindrical connecting portion 54 by either press fitting or by shrink fitting. Impeller 56 has a series of impeller blades 58 which serve to compress air aspirated into air intake structure 32. While many compressor designs may be used, the compressor of the apparatus of the invention is preferably a centrifugal flow compressor of straight or curved blade design with a curved inlet inducer.

The compressor section 12 and turbine section 13 of the apparatus are separated by member 60 which is preferably disk shaped and radially supported in an annular recess 53 defined between compressor section 12 and turbine section 13 as illustrated in FIG. 1. Member 60 occupies substantially the entire space of an angular recess 55 in rotor assembly 48 formed by the axial spacing between the facing backsides of turbine wheel 49 and compressor impeller 56. Member 60 is preferably formed of a low thermal conductivity and refractory material. By low thermal conductivity, it is meant a material with a thermal conductivity significantly below those of most metals such as the thermal conductivity of ceramics or graphite. Thus, in addition to providing a seal between the compressor section 12 and turbine section 13, member 60 serves as a heat insulator reducing the amount of heat transferred from the hot turbine section 13 to the compressor section 12.

A circular recess 62 may be provided in member 60 facing the backside of compressor impeller 56. The clearance between the bottom of recess 62 and the backside of the impeller 56 is typically in the order of 0.008 to 0.010 inch while the clearance between the backside of turbine wheel 49 and member 60 is typically approximately 0.040 inch. Clearance between the outer circumference of cylindrical connecting portion 54 and member 60 is typically approximately 0.002 inch. These clearances normally provide an adequate seal between the compressor section 12 and the turbine section 13. If this seal is not adequate for a particular design, a closely fitting labyrinth type seal 64 of a type well known in the art may be provided to seal the outer circumference of cylindrical connecting portion 54 to member 60. Labyrinth type seals (not shown) may also be provided on the radial back surfaces of compressor impeller 56.

Lubrication is provided to sleeve bearing 38 from a source of pressurized lubricating fluid which is typically derived from the oil supply source associated with an internal combustion engine. Such an engine may be turbosupercharged using the apparatus of this invention by having the exhaust gases of the engine drive the turbine and having the compressor supply compressed air to the air intake port of the engine.

A conduit supplying lubrication oil is attached to fitting 66 thus supplying oil to passageway 68 through rib 34. Passageway 68 feeds oil to an annular groove 70 in shaft support member 24 thus supplying oil to a short passageway 71 in shaft 22, regardless of the final, assembled rotational position of shaft 22. Passageway 71 connects to axially extending passageway 42. A series of radially extending diametrically drilled passageways 73 are provided to allow lubricating fluid from axially extending passageway 42 to enter the region between stationary shaft 22 and sleeve bearing 38. Screw 40 may also be provided with a central axially extending passageway 72 (FIGS. 3-5) along its length to permit lubricating oil to flow directly from passageway 42 to the area between head 44 of screw 40 and the bottom wall 51 of the cylindrical opening of rotor assembly core 50 in which the assembly of stationary shaft 22 and sleeve bearing 38 is disposed. Lubricating fluid may also reach this area, if an axial bore is not provided within screw 40 as described below. In either event, a thrust tending to push the rotor assembly 48 toward the turbine section of the housing (to the right in FIG. 1) is produced. This thrust operates in the direction opposite the axial thrust generally produced upon a rotor assembly in a turbocompressor due to pressure differentials between the compressor section 12 and the turbine section 13 during normal operation.

Sleeve bearing 38 is configured with an integral radially outwardly exending annular member 74. A mating recess 75 for annular member 74 is formed in cylindrical connecting portion 54 of rotor assembly 48 by a stepped increase in internal diameter and the introduction of a press fitted cylindrical axially extending extension member or thruster 76 which extends into the enlarged diameter portion of the cylindrical opening of rotor assembly 48 and rotates with rotor assembly 48. The facing radial surfaces of annular member 74 and the complementary recess 75 formed in the opening in rotor assembly 48 serve as thrust bearing surfaces transfering axial loads (thrust) from the rotor assembly 48 to sleeve bearing 38. These forces are then transferred to radially extending surfaces 39A and 39B at the ends of sleeve bearing 38 to be in turn transferred to shaft 22 directly from surface 39A and by means of screw 40 from surface 39B.

Thruster 76 is configured with a radially inwardly extending flange 78 which opposes a shoulder 77 formed in sleeve bearing 38. The radial surface of shoulder 77 and the facing radial surface of flange 78 provide an additional thrust bearing surface.

Lubricating fluid which is forced into the space between shaft 22 and sleeve bearing 38 is eventually forced through passageways 80, which are diametrically extending holes in sleeve bearing 38, to the area between sleeve bearing 38 and the internal surface of the opening in rotor assembly 48 which accepts the assembly of stationary shaft 22 and sleeve bearing 38. Oil distribution grooves (not shown) extending axially along the external circumferential surface of sleeve bearing 38 may be provided so as to intersect the openings of passageways 80 and thus aid in providing fluid along the entire length of sleeve bearing 38. The lubricating fluid is forced directly to the thrust bearing surfaces defined by the radial surfaces of annular member 74 and recess 75 through axially extending passageways 81 which intersect the diametrically extending passageways 80 in annular member 74, the distribution of fluid being aided by radially extending oil distribution grooves (not shown) which intersect the opening of passageways 81 on the radially extending surfaces of annular member 74. Lubricating fluid is also forced into the region between the outer surface of sleeve bearing 38 and the inner circumferential surface of thruster 76. Even if a channel 72 is not provided in screw 40, some lubricating fluid will eventually occupy the region between the head of screw 40 and the flat bottom of the cylindrical opening of rotor assembly 48.

Flange 78 of thruster 76 also forms a rotational bearing surface cooperating with sleeve bearing 38. All of the lubricating fluid pumped into the bearing area eventually passes from these surfaces and appears in a recess 82 formed in support member 24. A passageway 84 is provided to collect this lubricating fluid which is conducted to fitting 86 and then back to the pressurized lubricating fluid source. It will be understood by one skilled in the art that the high rotational rate of rotor assembly 48 aids in centrifugally pumping lubricating fluid from the sleeve bearing 38 into the recess 82 from which it is scavenged.

A lubricating fluid mechanical seal in the form of an annular graphite ring 88 is biased by spring 92 against a metal contacting ring 90 which rotates with rotor assembly 48. This is a conventional type of fluid seal well known in the art.

A helical thread or windback 94 may also be provided on the external circumference of thruster 76 with the sense of the helix being such that it effectively acts as a screw pump propelling fluid away from the mechanical seal.

The lubricating fluid dispersed in the manner described will tend to produce an axial thrust upon rotor assembly 48 by virtue of its action upon the internal radial surface of flange 78. If, in fact, flange 78 is provided, the degree to which it extends radially inwardly and therefore the area of the internal radial surface may be adjusted so that the sum of the hydraulic axial thrust thus created plus the axial thrust created as a result of the pressure differential between turbine section 14 and compressor section 12 will be approximately equal to the axial thrust created by hydraulic pressure on the bottom wall 51 of the blind cylindrical opening in rotor assembly 48 which accepts the assembly of the shaft 22 and bearing 38. Such a balance would of necessity be approximate, however, because the pressure differential between the turbine section and the compressor section may vary with operating conditions.

The first step in assembling turbo-compressor 10 is to place shaft 22 into sleeve bearing 38 and secure it with screw 40 by using a suitable tool which engages slot 45 of head 44 being certain that head 44 fits into cylindrical cutouts 46 of sleeve bearing 38. Rotor core member 50 is then placed over this assembly. If member 60 is of single piece construction, it is then placed around cylindrical connecting portion 54 of rotor core member 50 prior to press fitting of compressor impeller 56 onto cylindrical connecting portion 54. Thruster 76 is then press fitted into cylindrical portion 54. Contacting ring 90 is then press fitted around thruster 76. Annular graphite ring 88 and spring 92 are placed within cylindrical recess 82, after washer 26 has been put in place. Shaft 22 is then fitted and secured into support member 24 by tightening nut 28. Turbine housing section 15 is then assembled onto compressor housing section 14 compressing O-ring 20 in annular groove 18, the V-band clamp 16 being tightened only after the correct relative rotational orientation between compressor housing section 14 and turbine housing section 15 for the particular installation has been achieved. If member 60 is formed of more than one piece, it need not be placed between turbine wheel 49 and compressor impeller 56 until just before shaft 22 is secured into support member 24. Practical considerations may, in some cases, favor a multipiece construction for member 60 in which it is, for example, comprised of two half moon-shaped members which are fitted together to form a circular seal. Such multipiece construction would be required if the entire rotor assembly 48 were of a one-piece construction with turbine wheel 49, cylindrical connecting portion 54 and compressor impeller 56 being integrally formed of a high temperature exotic alloy.

In operation, a gas, usually air or a fuel/air mixture, which is to be compressed is allowed into the compressor section through air intake structure 32 and is compressed into compressor scroll region 96 from which it is removed by being conducted into a suitable conduit (not shown) attached to the output of compressor section 12. Exhaust gases, on the other hand, are conducted to turbine scroll region 98 by a suitable conduit (not shown) attached to an input portion of turbine section 13 and after giving up energy to the turbine wheel are exhausted through exhaust opening 100.

Unlike most turbo-compressors, which must be operated with the shaft horizontally disposed, the bearing and lubrication seal arrangements of the present invention permit the turbo-compressor 10 to be installed in any desired orientation, as long as the unsupported end of shaft 22 is not lower than the supported end, thus assuring that gravity will not aid in causing lubricating fluid to reach the mechanical seal.

Figure 6:
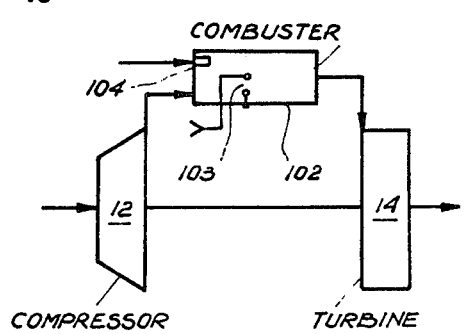
FIG. 6 is a block diagram of the apparatus of the invention used with a combustor.

While the energy source for driving the apparatus is generally an internal combustion engine which serves as a prime mover for a vehicle, it is possible to configure the apparatus with a heat source such as a combustor so that it itself may become a source of energy. Referring to FIG. 6, a source of fuel is supplied into the combuster 102 through a suitable means such as a fuel injector 104. Compressed air from compressor section 12 is conducted to combustor 102 by a suitable conduit, whereby the fuel from fuel injector 104 is ignited by igniter 103 and burned in combuster 102. After combustion is initiated exhaust gases of high energy are produced; this exhaust gas is provided to turbine section 14 thus driving the apparatus. The exhaust gas from turbine section 14 may in itself be sufficiently energetic to provide thrust in certain limited applications or alternatively means can be provided for obtaining rotational energy from the rotor assembly by means of an appropriate turbine rotor and shaft.

The present invention may be embodied in other specific forms without departing from the spirit or essential attributes thereof and, accordingly, reference should be made to the appended claims, rather than to the foregoing specification as indicating the scope of the invention.

What is claimed is:

1. A turbo-compressor apparatus, comprising
   (a) housings defining a turbine section and a compressor section;
   (b) a non-rotating shaft supported axially in said apparatus;
   (c) a sleeve bearing surrounding said shaft and having surfaces adapted to absorb radial and axial loads placed on said sleeve bearing, said sleeve bearing having openings therein;
   (d) a rotation preventing means extending from the shaft through said openings to prevent rotation of said sleeve bearing while permitting said sleeve bearing limited axial motion with respect to said shaft;
   (e) a rotor assembly rotatably mounted upon said sleeve bearing, said rotor assembly having a turbine wheel disposed within said turbine section and a compressor impeller disposed within said compressor section, said rotor assembly having a cylindrical axially extending opening defining a bearing surface adapted to receive said sleeve bearing; and
   (f) a means for providing lubrication to said sleeve bearing to fully float said bearing with respect to said shaft and to reduce the friction between said sleeve bearing and said bearing surface.

2. The apparatus of claim 1, in which said shaft has a supported portion supported by said housing and an unsupported portion, said unsupported portion extending into said cylindrical opening.

3. The apparatus of claim 2, in which said shaft extends into said cylindrical opening from the compressor section.

4. The apparatus of claim 3, further comprising means for introducing pressurized lubricating fluid between an end of said unsupported portion of said shaft and said bottom wall.

5. The apparatus of claim 4, further comprising:

(a) a cylindrical thruster circumferentially surrounding said sleeve bearing and affixed to rotate with said rotor assembly and extending toward the supported portion of said shaft;
(b) a radially inwardly extending annular flange having a first radial surface, said flange extending from said thruster; and
(c) a shoulder formed in said sleeve bearing and having a second radial surface disposed in facing relationship to said first radial wall.

6. The apparatus of claim 5, further comprising means for supplying pressurized lubricating fluid between said first and said second radial walls.

7. The apparatus of claim 2, in which said cylindrical opening terminates in a bottom wall.

8. The apparatus of claim 7, in which said unsupported portion extends to substantially said bottom wall.

9. The turbo-compressor of claim 1 in which said openings are cutouts in said sleeve bearing, said cutouts extending along said sleeve bearing from an end of said sleeve bearing.

10. The turbo-compressor apparatus of claim 1 in which the rotation preventing apparatus comprises the head of a screw secured to an end of said shaft.

11. A turbo comprisor apparatus comprising
(a) housings defining a turbine section and a compressor section;
(b) a non-rotating shaft means supported axially in said apparatus;
(c) a sleeve bearing surrounding said shaft means, said bearing having a radially extending annular member, said annular member having first radially extending surfaces for absorbing axial loads placed on said first surfaces, the first surfaces each having a first surface area, the bearing also having second radially extending surfaces at each end, the second surfaces each having second surface areas, the second surfaces being in facing relationship with third surfaces of said shaft means, the first surface areas being substantially greater than the second surface areas, said sleeve bearing having openings therein;
(d) a rotation preventing means extending from the shaft through said openings to prevent rotation of said sleeve bearing while permitting said sleeve bearing limited axial motion with respect to said shaft
(e) a rotor assembly rotatably mounted upon said sleeve bearing, said rotor assembly having a turbine wheel disposed within said turbine section and a compressor impeller disposed within said compressor section, said rotor assembly having a cylindrical axially extending opening defining a bearing surface, said cylindrical opening being for receiving said sleeve bearing, the bearing surface having an annular recess for receiving said annular member, said annular recess having fourth radially extending surfaces disposed in facing relationship to said first surfaces; and
(f) a means for providing lubrication to said sleeve bearing to fully float said sleeve bearing with respect to said shaft means and to reduce rotating friction between
(i) said sleeve bearing and said bearing surface; and
(ii) said first and fourth surfaces.

12. The apparatus of claim 11, in which said shaft means has a supported portion supported by said housing and an unsupported portion, said unsupported portion extending into said cylindrical opening.

13. The apparatus of claim 12, in which said shaft means extends into said cylindrical opening from said compressor section.

14. The apparatus of claim 12, in which said cylindrical opening terminates in a bottom wall.

15. The apparatus of claim 14, in which said unsupported portion extends to substantially said bottom wall of said cylindrical opening.

16. The apparatus of claim 14, further comprising means for introducing pressurized lubricating fluid between an end of the unsupported portion of said shaft and said bottom wall.

17. The turbo-compressor apparatus of claim 8 or 11, in which:
(a) said rotor assembly has an annular recess separating said turbine wheel from said compressor impeller; and
(b) a separating member is supported radially in said housing in closely spaced relation to said rotor assembly substantially occupying a region defined by said annular recess and providing a seal between said compressor section and said turbine section of said housing; said separating member being comprised of a material of low thermal conductivity.

18. The apparatus of claims 8 or 11, further comprising:
(a) a shaft supporting member coupled to said housing and disposed within an air intake structure of said compressor section in the path of air drawn into said compressor;
(b) at least one axial support extending from a peripheral portion of said air intake structure to said shaft supporting member;
(c) a means for conducting lubricating fluid to said bearing disposed within said air intake structure; and
(d) a second means for conducting scavenged oil away from the shaft supporting member.

19. The apparatus of claims 1 or 11, further comprising:
(a) a combustor which receives compressed air from said compressor section, said combustor having:
(i) means for providing fuel to a combustion region of said combustor; and
(ii) means for initiating the combustion of said fuel in said combustion region in the presence of said compressed air to produce high energy exhaust gases;
(b) means for conducting compressed air from said compressor section to said combustor; and
(c) means for conducting hot exhaust gases from said combustor to said turbine section.

20. The turbo compressor apparatus of claim 11 in which at least one of said second surface areas is defined by a wall thickness of said sleeve bearing.

21. The turbo compressor apparatus of claim 11 in which said first radially extending surfaces are removed from the ends of said sleeve bearing.

* * * * *